United States Patent
Bastos Moraes et al.

(10) Patent No.: US 11,115,080 B2
(45) Date of Patent: Sep. 7, 2021

(54) METHOD AND APPARATUS FOR DETERMINATION OF VECTORING MATRICES

(71) Applicant: Alcatel Lucent, Nozay (FR)

(72) Inventors: Rodrigo Bastos Moraes, Antwerp (BE); Paschalis Tsiaflakis, Antwerp (BE); Mihaela Jivanescu, Antwerp (BE); Jochen Maes, Antwerp (BE); Carl Nuzman, Murray Hill, NJ (US)

(73) Assignee: Alcatel Lucent, Nozay (FR)

( * ) Notice: Subject to any disclaimer, the term of this patent is extended or adjusted under 35 U.S.C. 154(b) by 574 days.

(21) Appl. No.: 16/077,850

(22) PCT Filed: Feb. 23, 2017

(86) PCT No.: PCT/EP2017/054111
§ 371 (c)(1),
(2) Date: Aug. 14, 2018

(87) PCT Pub. No.: WO2017/144561
PCT Pub. Date: Aug. 31, 2017

(65) Prior Publication Data
US 2021/0194539 A1 Jun. 24, 2021

(30) Foreign Application Priority Data
Feb. 26, 2016 (EP) .................................. 16305222

(51) Int. Cl.
*H04M 3/34* (2006.01)
*H04B 3/32* (2006.01)
*H04M 3/30* (2006.01)

(52) U.S. Cl.
CPC ............... *H04B 3/32* (2013.01); *H04M 3/30* (2013.01); *H04M 3/34* (2013.01)

(58) Field of Classification Search
None
See application file for complete search history.

(56) References Cited

U.S. PATENT DOCUMENTS 8,300,726 B2 * 10/2012 Ashikhmin ............ H04B 3/487
375/296
9,210,004 B2 12/2015 Talvitie et al.
(Continued)

FOREIGN PATENT DOCUMENTS

| CN | 102792653 A | 11/2012 |
| CN | 103262432 A | 8/2013 |
| CN | 103493385 A | 1/2014 |

OTHER PUBLICATIONS

Office Action and Search Report for corresponding Chinese Application No. 201780013739.8 dated Nov. 26, 2020.
(Continued)

*Primary Examiner* — Quoc D Tran
(74) *Attorney, Agent, or Firm* — Harness, Dickey & Pierce, P.L.C.

(57) ABSTRACT

A vectoring controller is configured to determine first coefficient values for a vectoring matrix at a first tone based on a first number of iterations through an iterative update algorithm and a first channel matrix estimate at the first tone, and to determine second coefficient values for the vectoring matrix at a second neighboring tone based on a second number of iterations through the iterative update algorithm and a second channel matrix estimate at the second tone. The vectoring controller is configured to start with the first coefficient values as initial values for the respective second coefficient values in the iterative update algorithm. The second number of iterations is lower than or equal to the first number of iterations.

13 Claims, 6 Drawing Sheets

(56) References Cited

U.S. PATENT DOCUMENTS

| | | | | |
|---|---|---|---|---|
| 9,531,866 B2* | 12/2016 | Lu | | H04M 3/34 |
| 2006/0146945 A1* | 7/2006 | Chow | | H04L 25/03159 |
| | | | | 375/260 |
| 2010/0329386 A1* | 12/2010 | De Lind Van Wijngaarden | | ......... |
| | | | | H04M 11/062 |
| | | | | 375/296 |
| 2012/0320959 A1* | 12/2012 | Lu | | H04B 3/32 |
| | | | | 375/224 |
| 2013/0229905 A1* | 9/2013 | Schenk | | H04M 11/062 |
| | | | | 370/201 |
| 2016/0173682 A1* | 6/2016 | Lu | | H04B 7/0617 |
| | | | | 379/406.01 |
| 2016/0191117 A1* | 6/2016 | Vanderhaegen | | H04B 3/32 |
| | | | | 370/201 |
| 2017/0318150 A1* | 11/2017 | Tsiaflakis | | H04L 1/201 |
| 2019/0058502 A1* | 2/2019 | Tsiaflakis | | H04J 11/0033 |

OTHER PUBLICATIONS

Lanneer Wouter et al: "Linear and Nonlinear Precoding Based Dynamic Spectrum Management for Downstream Vectored G.fast Transmission", 2015 IEEE Global Communications Conference (GLOBECOM), IEEE, Dec. 6, 2015 (Dec. 6, 2015), pp. 1-6, XP032872585, DOI: 10.1109/GLOCOM.2014.7417444.

* cited by examiner

METHOD AND APPARATUS FOR DETERMINATION OF VECTORING MATRICES

CROSS-REFERENCE TO RELATED APPLICATIONS

This application is a national phase under 35 U.S.C. § 371 of PCT International Application No. PCT/EP2017/054111 which has an International filing date of Feb. 23, 2017, which claims priority to European Application No. 16305222.8, filed Feb. 26, 2016, the entire contents of each of which are hereby incorporated by reference.

TECHNICAL FIELD OF THE INVENTION

The present invention relates to crosstalk mitigation within a wired communication system, and more specifically to a method and apparatus for determination of vectoring matrices that are used for joint processing of Discrete Multi-Tone (DMT) communication signals to be transmitted over, or received from, a plurality of subscriber lines.

TECHNICAL BACKGROUND OF THE INVENTION

Crosstalk (or inter-channel interference) is a major source of channel impairment for wired communication systems, such as Digital Subscriber Line (DSL) communication systems.

As the demand for higher data rates increases, systems are evolving toward higher frequency bands, wherein crosstalk between neighboring transmission lines (that is to say transmission lines that are in close vicinity over part or whole of their length, such as twisted copper pairs in a cable binder) is more pronounced (the higher frequency, the more coupling).

For instance, in the recommendation entitled "*Very High Speed Digital subscriber Line Transceivers 2*", ref. 6.993.2, and adopted by the International Telecommunication Union (ITU) in April 2010 (VDSL2 hereinafter), the transmit spectrum has been broadened from 2 MHz (ADSL2+) up to 17 MHz with transmit profile 17a and 4,3125 kHz carrier spacing. In G.9701 ITU recommendation (G.fast hereinafter), the transmit spectrum goes up to 106 MHz with transmit profile 106a and 51.75 kHz carrier spacing. A 212 MHz transmit profile is even defined for further study.

Different strategies have been developed to mitigate crosstalk and to maximize effective throughput, reach and line stability. These techniques are gradually evolving from static or dynamic spectrum management techniques to multi-user signal coordination a.k.a. vectoring.

One vectoring technique for mitigating crosstalk is signal precoding: the user data symbols are jointly passed through a precoder before being transmitted over the respective communication channels. The precoder is such that the concatenation of the precoder and the communication channels results in little or no inter-channel interference at the receivers.

A further vectoring technique for mitigating crosstalk is signal postcoding (or post-processing): the receive data symbols are jointly passed through a postcoder before being detected. The postcoder is such that the concatenation of the communication channels and the postcoder results in little or no inter-channel interference at the detectors. Postcoders are also known as crosstalk cancellation filters.

Signal vectoring is typically performed at a traffic aggregation point as multi-user signal coordination between co-located transceivers is required: signal precoding is particularly appropriate for downstream communication (i.e., toward customer premises), while signal postcoding is particularly appropriate for upstream communication (i.e., from customer premises).

More formally, an N×N Multiple Input Multiple Output (MIMO) channel can be described by the following linear model: $y_k = H_k x_k + z_k$, wherein the N-component complex vector $x_k$, respectively $y_k$, is a discrete frequency representation, as a function of the frequency index k, of the symbols transmitted over, respectively received from, the N vectored channels, wherein the N×N complex matrix $H_k$ is the channel matrix: the (i,j)-th component $h_{ij}$ of the channel matrix $H_k$ describes how the communication system produces a signal on the i-th channel output in response to a signal being fed to the j-th channel input; the diagonal elements of the channel matrix describe direct channel coupling, and the off-diagonal elements of the channel matrix (also referred to as the crosstalk coefficients) describe inter-channel coupling, and wherein the N-component complex vector $z_k$ denotes additive noise over the N channels, such as Radio Frequency Interference (RFI) or thermal noise.

The following mathematical notation will be adhered to: boldface upper-case letters denote matrices; boldface lowercase letters denote column vectors; and regular lowercase letters denote real or complex scalars.

Signal precoding and postcoding are advantageously implemented by means of matrix products.

In downstream, a linear precoder performs a matrix-product in the frequency domain of a transmit vector uk with a precoding matrix $P_k$ before actual transmission over the respective communication channels, i.e. actual transmit vector is $x_k = P_k u_k$.

In upstream, a linear postcoder performs a matrix-product in the frequency domain of the receive vector $y_k$ with a postcoding matrix $Q_k$ to recover the transmit vector $u_k$ (after channel equalization and power normalization), i.e. detection is performed on $y'_k = Q_k y_k$.

The performance of signal vectoring depends critically on the component values of the precoding and postcoding matrix, which component values are to be computed and updated according to the actual and varying channel couplings.

In addition, a trade-off is to be found between completely eliminating inter-channel interference without any regard to how much energy of the signal of interest is lost in this process, and preserving as much energy content of the signal of interest as possible at the cost of possibly facing higher inter-channel interference.

For instance, the precoding matrix $P_k$ or the postcoding matrix $Q_k$ can be computed as the matrix inverse of the channel matrix, meaning that the off-diagonal coefficients of the overall channel matrix $H_k P_k$ or $Q_k H_k$, and thus the inter-channel interference, mostly reduce to zero. Such "diagonalizing" precoders and postcoders are characterized as Zero-Forcing (ZF) as they seek to null-out the crosstalk interference terms. ZF is very effective with MIMO channels that are diagonally dominant and hence well-conditioned, which is typically the case with VDSL2 transmit profiles. The inverse of the channel matrix can be computed or approximated with explicit "one-shot" algorithms that give excellent performance.

Because next generation vectoring systems, such as G.fast and XG-FAST, work at much higher frequencies, the channels are often non-diagonally dominant, and sometimes even ill-conditioned, and ZF can be far from optimal: the channel inverse yields too large vectoring coefficients that cause a substantial increase of the transmit power (precoding) or of the background noise (postcoding). The increase of the transmit power directly translates into lower direct signal gains for power-constrained systems that shall keep their transmit power within the allowable bounds (transmit PSD mask, per-line transmit power, total aggregate transmit power), leading to poor channel utilization and low data rates for the end users. Likewise, the increase of the background noise severely degrades the signal to Noise Ratio (SNR) and thus the achievable data rate.

For most next-generation vectoring designs, a better strategy is to optimize a given cost or utility function, typically an aggregate data rate or a Mean squared Error (MSE) of the communication system. These optimization problems are often non-convex and cannot be solved analytically. Instead, they are typically handled through iterative updates that gradually converge towards a local or global optimum of the cost or utility function. The iterative update algorithm starts with some initial default value for the vectoring matrix (typically the identity matrix I) and, based on some channel estimates, repeatedly adjusts the coefficient values of the vectoring matrix through successive iterations, and till some convergence criteria is met.

An example of such an iterative algorithm is the iterative minimum Mean squared Error (iMMSE) algorithm, which is very robust and does not require any kind of channel structure, such as diagonal dominance, for good performance. However, the iMMSE requires multiple iterations per-tone. Every iteration builds up on the previous and each of them only improves the performance of the vectoring processor. Each iteration can be seen as a step in the process of learning about local optimality of the corresponding channel. Convergence, however, is obtained in approximately 10-20 iterations, and each iMMSE iteration has complexity $o(N^3)$. This is a significant disadvantage in large systems, for which even a single iteration may already strain the speed and memory capabilities of existing hardware.

Iterative algorithms can also be used to compute the channel inverse for ZF precoders or postcoders. An example is the Schulz method, which converges towards the matrix inverse through successive iterations.

SUMMARY OF THE INVENTION

It is an object of the present invention to design an integrated hardware and software module that can quickly and efficiently compute advanced precoders and postcoders, and that is especially advantageous for channels that are not diagonally-dominant.

In accordance with a first aspect of the invention, a vectoring controller for determination of a vectoring matrix that is used for joint processing of Discrete Multi-Tone DMT communication signals to be transmitted over, or received from, a plurality of subscriber lines is configured to determine first coefficient values for the vectoring matrix at a first tone by means of a first number of iterations through an iterative update algorithm and based on a first channel matrix estimate at the first tone, and to determine second coefficient values for the vectoring matrix at a second neighboring tone by means of a second number of iterations through the iterative update algorithm and based on a second channel matrix estimate at the second tone. The vectoring controller is further configured to use the so-determined first coefficient values as initial starting values for the respective second coefficient values in the iterative update algorithm. The second number of iterations is lower than or equal to the first number of iterations.

In one embodiment of the invention, the iterative algorithm is an iterative minimum Mean squared Error iMMSE update algorithm, and the second number of iterations is equal to 1.

In one embodiment of the invention, the iterative algorithm is a Schulz update algorithm, and the second number of iterations is equal to 1, 2 or 3.

In one embodiment of the invention, the vectoring controller is further configured to derive the first and second channel matrix estimates from raw Discrete Fourier Transform DFT samples of signals received from the subscriber lines while crosstalk probing signals are being transmitted over the subscriber lines.

In one embodiment of the invention, the vectoring controller is further configured to derive the first and second channel matrix estimates from slicer error samples of signals received from the subscriber lines while crosstalk probing signals are being transmitted over the subscriber lines.

In one embodiment of the invention, the vectoring controller is further configured to determine third coefficient values for the vectoring matrix at a third further-neighboring tone by means of a third number of iterations through the iterative update algorithm and based on a third channel matrix estimate at the third tone. The vectoring controller is further configured to start with the so-determined second coefficient values as initial values for the respective third coefficient values in the iterative update algorithm. The third number of iterations is lower than or equal to the first number of iterations.

In one embodiment of the invention, the first, second and third tones are tones with increasing or decreasing tone index.

In one embodiment of the invention, the first tone is selected among a set of reference tones.

In one embodiment of the invention, the vectoring controller comprises a processor, a fast-access memory and a slower-access memory. The slower-access memory is configured to hold the first channel matrix estimate. The fast-access memory is configured to be loaded with the first channel matrix estimate from the slower-access memory. The processor is configured to read the first channel matrix estimate from the fast-access memory, to determine the first coefficient values, and to write the so-determined first coefficient values into the fast-access memory. The slower-access memory is configured to be loaded with the first coefficient values from the fast-access memory, and to hold the first coefficient values for further configuration of a vectoring processor. The first coefficient values are retained in the fast-access memory for further determination of the second coefficient values.

In one embodiment of the invention, the processor is further configured to determine the second coefficient values, and to substitute the second coefficient values for the first coefficient values in the fast-access memory. The second coefficient values are retained in the fast-access memory for further determination of the third coefficient values.

In one embodiment of the invention, the processor is configured to run multiple threads for determination of coefficient values for the vectoring matrix at respective tones.

Such a vectoring controller typically forms part of an access node, such as a Digital Subscriber Line Access Multiplexer (DSLAM—vectored VDSL2) or a Distribution Point Unit (DPU-G.fast), deployed at a Central Office (CO)

or as a fiber-fed remote unit closer to subscriber premises (street cabinet, pole cabinet, building cabinet, etc).

In accordance with another aspect of the invention, a method for determining a vectoring matrix that is used for joint processing of Discrete Multi-Tone DMT communication signals to be transmitted over, or received from, a plurality of subscriber lines, comprises determining first coefficient values for the vectoring matrix at a first tone by means of a first number of iterations through an iterative update algorithm and based on a first channel matrix estimate at the first tone, and determining second coefficient values for the vectoring matrix at a second neighboring tone by means of a second number of iterations through the iterative update algorithm and based on second a channel matrix estimate at the second tone. The method further comprises starting with the so-determined first coefficient values as initial values for the respective second coefficient values in the iterative update algorithm. The second number of iterations is lower than or equal to the first number of iterations.

Embodiments of a method and of an access node according to the invention correspond with the aforementioned embodiments of a vectoring controller according to the invention.

An integrated software and hardware architecture is proposed for the computation of the vectoring matrix through complex iterative update algorithms.

First, the required number of iterations is drastically reduced by using the vectoring coefficients as previously determined at a given tone as the starting point for iterations at one or more neighboring tones.

This idea exploits tone correlation (a.k.a. channel coherence), i.e. the fact that channels on neighboring tones are very similar. More specifically, the input for the computations at tone k is the vectoring matrix computed at tone k−1 or k+1. In this fashion, the burden of performing multiple iterations per tone is avoided, turning complex iterative update algorithms into one-shot methods (i.e., one or two iterations). Because channel matrices from neighboring tones change moderately, the impact of this method on performance is minimal, and the reduction in computation complexity is 10-fold.

Second, the time required for each iteration is reduced through an ad-hoc hardware architecture that enables a fast and efficient execution of the above iterative algorithm.

The components of this architecture are a processor, a fast-access memory unit and a slower-access memory unit characterized as follows:
  The fast-access memory unit can be accessed by the processor at its cycle speed (e.g., L1 cache).
  The fast-access memory unit is populated by another slower-access memory unit (e.g., DDR memory) with per-tone channel matrix estimates.
  The computation of the vectoring matrix is performed sequentially tone per tone.
  The computation of the vectoring matrix at one tone is based on a vectoring matrix computation at a neighboring tone, thereby avoiding multiple iterations for the same tone and exploiting tone correlation to the maximum extent.
  The fast-access memory unit is designed such that the computed vectoring matrix at one tone can be directly used for the computation of the vectoring matrix at a neighboring tone without access to the slower-access memory unit.

Multiple instances of the above hardware architecture may be combined and steered by multiple threads to further increase performances.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
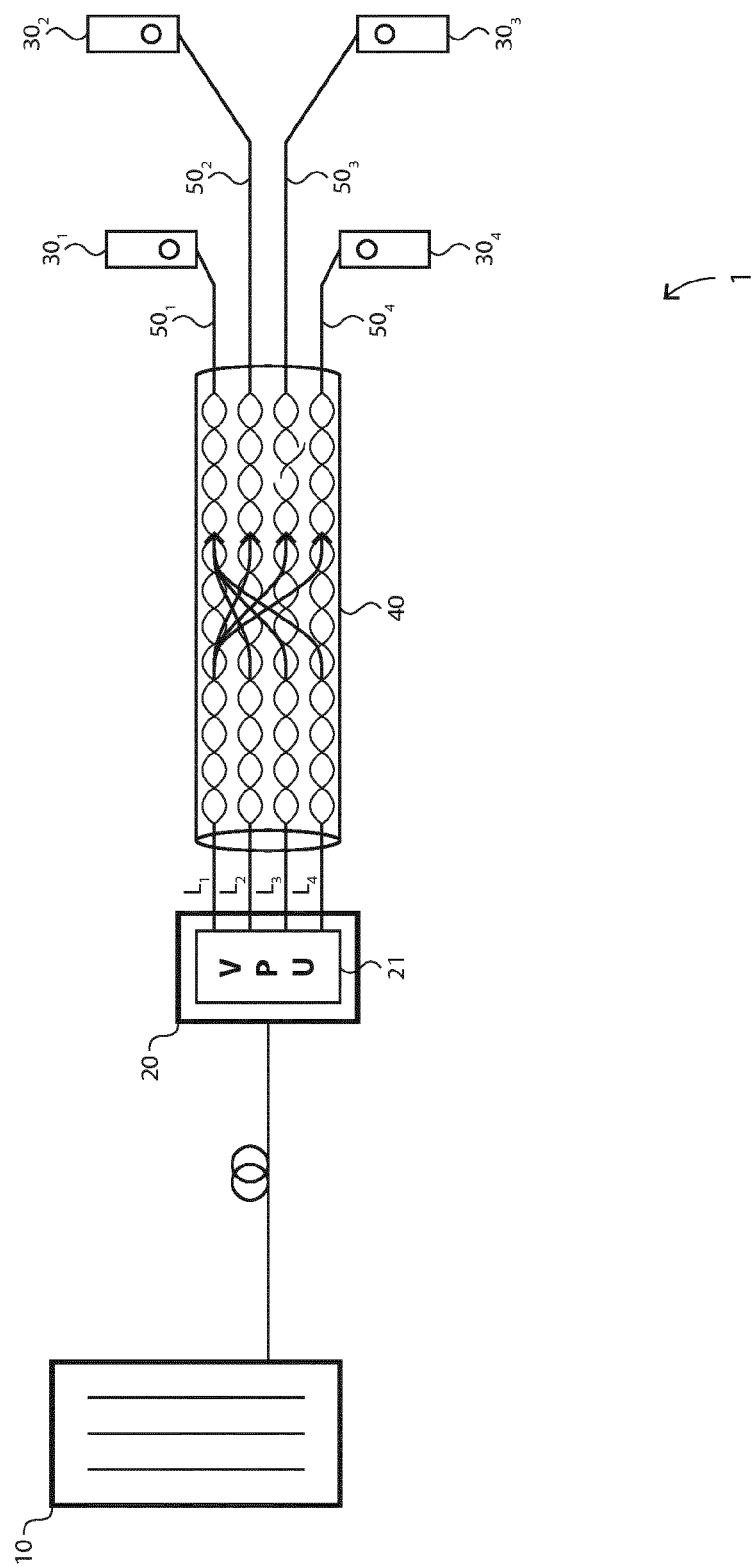
FIG. 1 represents an overview of an access plant.

There is seen in FIG. 1 an access plant 1 comprising a network unit 10 at a CO, an access node 20 coupled via one or more optical fibers to the network unit 10, and further coupled via a copper plant to Customer Premises Equipment (CPE) 30 at various subscriber locations. The transmission media of the copper plant is typically composed of copper Unshielded Twisted Pairs (UTP).

As an illustrative example, the copper plant comprises four subscriber lines $L_1$ to $L_4$ sharing a common access segment 40, and then going through dedicated loop segments 50 for final connection to CPEs $30_1$ to $30_4$ respectively.

Within the common access segment 40, the subscriber lines $L_1$ to $L_4$ are in close vicinity and thus induce crosstalk into each other (see the arrows in FIG. 1 between the respective subscriber lines).

The access node 20 comprises a Vectoring Processing Unit 21 (or VPU) for jointly processing the data symbols that are being transmitted over, or received from, the copper plant in order to mitigate the crosstalk and to increase the achievable data rates.

The choice of the vectoring group, i.e. the set of communication lines whose communication signals are to be jointly processed, is rather critical. Within a vectoring group, each communication line is considered as a disturber line inducing crosstalk into the other communication lines of the group, and the same communication line is considered as a victim line incurring crosstalk from the other communication lines of the group. Crosstalk from lines that do not belong to the vectoring group is treated as alien noise and is not canceled. Ideally, the vectoring group should match the whole set of communication lines that physically and noticeably interfere with each other, else limited vectoring gains are to be expected.

Figure 2:
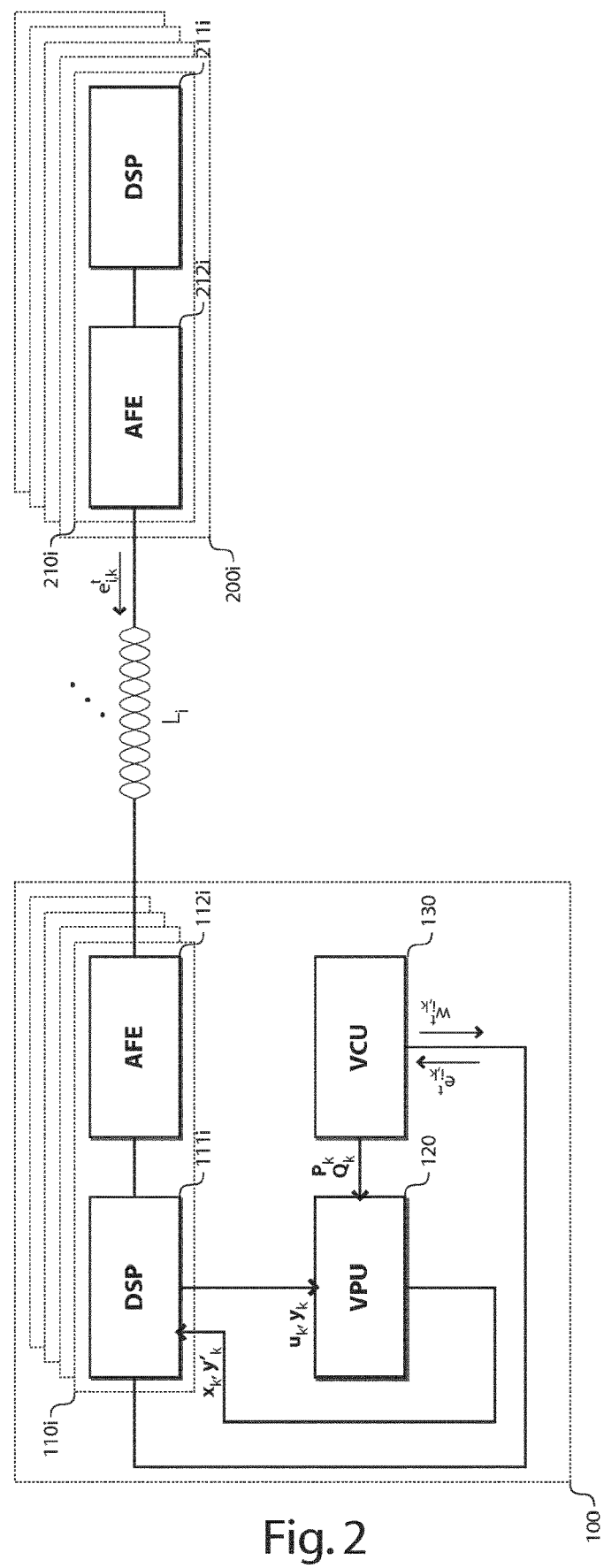
FIG. 2 represents further details about an access node.

There is seen in FIG. 2 further details about an access node 100 and respective CPEs 200.

The access node 100 comprises:
  N transceivers 110;
  a Vectoring Processing Unit (VPU) 120; and
  a Vectoring Control Unit (VCU) 130 for controlling the operation of the VPU 120.

The N transceivers 110 are individually coupled to the VPU 120 and to the VCU 130. The VCU 130 is further coupled to the VPU 120.

The N transceivers 110 individually comprise:
a Digital signal Processor (DSP) 111; and
an Analog Front End (AFE) 112.

The N transceivers 110 are coupled to respective N transceivers 210 within CPEs 200 through N respective subscriber lines $L_1$ to $L_N$, which for convenience are assumed to form part of the same vectoring group.

The N transceivers 210 individually comprise:
a Digital Signal Processor (DSP) 211; and
an Analog Front End (AFE) 212.

The AFEs 112 and 212 individually comprise a Digital-to-Analog Converter (DAC) and an Analog-to-Digital Converter (ADC), a transmit filter and a receive filter for confining the signal energy within the appropriate communication frequency bands while rejecting out-of-band interference, a line driver for amplifying the transmit signal and for driving the transmission line, and a Low Noise Amplifier (LNA) for amplifying the receive signal with as little noise as possible.

In case of Frequency Division Duplexing (FDD) operation where downstream and upstream communications operate simultaneously over the same transmission medium in distinct and non-overlapping frequency bands, the AFEs 112 and 212 further comprise a hybrid for coupling the transmitter output to the transmission medium and the transmission medium to the receiver input while achieving low transmitter-receiver coupling ratio. The AFE may further accommodate echo cancellation filters to reduce the coupling ratio at a further extent.

In case of Time Duplexing Division (TDD) operation where downstream and upstream communications operate over the same frequency band but in distinct and non-overlapping time slots, the hybrid can be advantageously omitted as the transmitter and receiver operate in alternate mode: the receive circuitry is switched OFF (or the receive signal is discarded) while the transmit circuitry is active, and the way around, the transmit circuitry is switched OFF while the receive circuitry is active.

The AFEs 112 and 212 further comprise impedance-matching circuitry for adapting to the characteristic impedance of the transmission medium, clipping circuitry for clipping any voltage or current surge occurring over the transmission medium, and isolation circuitry (typically a transformer) for pc-isolating the transceiver from the transmission medium.

The DSPs 120 are for encoding and modulating user and control traffic into downstream DMT symbols, and for de-modulating and decoding user and control traffic from upstream DMT symbols.

The following transmit steps are typically performed within the DSPs 111 and 211:
data encoding, such as data multiplexing, framing, scrambling, error correction encoding and interleaving;
signal modulation, comprising the steps of ordering the tones according to a tone ordering table, parsing the encoded bit stream according to the respective bit loadings of the ordered tones, and mapping each chunk of bits onto an appropriate transmit constellation point (with respective carrier amplitude and phase), possibly with Trellis coding;
signal scaling, such as power normalization, transmit PSD shaping and fine gain scaling;
Inverse Fast Fourier Transform (IFFT);
cyclic Prefix (CP) insertion; and
time-windowing.

The following receive steps are typically performed within the DSPs 111 and 211:
time-windowing and CP removal;
Fast Fourier Transform (PPT);
Frequency EQualization (FEQ);
signal de-modulation and detection, comprising the steps of applying to each and every equalized frequency sample an appropriate constellation grid, the pattern of which depends on the respective bit loading, detecting the expected transmit constellation point and the corresponding transmit bit sequence, possibly with Trellis decoding, and re-ordering all the detected chunks of bits according to the tone ordering table; and
data decoding, such as data de-interleaving, error correction decoding, de-scrambling, frame delineation and de-multiplexing.

Some of these transmit or receive steps can be omitted, or some additional steps can be present, depending on the exact digital communication technology being used.

The DSPs 120 are further configured to operate a Special Operation Channel (SOC) for initializing a bi-directional communication session over a subscriber line, and an Embedded Operation Channel (EOC) for transporting diagnosis, management or On-Line Reconfiguration (OLR) commands and responses. The DSPs 120 are further configured to run the respective management entities for controlling the communication parameters of the various protocol layers in line with a Management Information Base (MIB). For G.fast, the DSPs 120 are further configured to operate a Robust Management Channel (RMC) for fast adaptation of the TDD framing parameters.

The DSPs 111 are further configured to supply transmit frequency samples $u_k$ to the VPU 120 before Inverse Fast Fourier Transform (IFFT) for joint signal precoding, and to supply receive frequency samples $y_k$ to the VPU 120 after Fast Fourier Transform (FFT) for joint signal post-processing.

The DSPs 111 are further configured to receive pre-compensated transmit samples $x_k$ from the VPU 120 for further transmission, and to receive post-compensated receive samples $y'_k$ from the VPU 120 for further detection. Alternatively, the DSPs 111 may receive correction samples to add to the initial frequency samples before further transmission or detection.

The VPU 120 is configured to mitigate the crosstalk induced over the subscriber lines $L_1$ to $L_N$. The VPU 120 comprises a linear precoder configured to multiply a vector $u_k$ of transmit frequency samples with a precoding matrix $P_k$ in order to pre-compensate an estimate of the expected crosstalk, and a linear postcoder configured to multiply a vector of receive frequency samples $y_k$ with a postcoding matrix $Q_k$ so as to post-compensate an estimate of the incurred crosstalk.

In the matrix $P_k$ or $Q_k$, a row i is associated with a particular victim line $L_i$, while a column j is associated with a particular disturber line $L_j$.

The VCU 130 is basically for controlling the operation of the VPU 120, and more specifically for estimating the channel couplings between the respective subscriber lines of the vectoring group, and for initializing and updating the coefficients of the precoding matrix $P_k$ and of the postcoding matrix $Q_k$ from the so-estimated channel couplings.

The various channel couplings are estimated based on pilot signals (a.k.a crosstalk probing signals) transmitted over the vectored lines. The pilot signals are typically transmitted during dedicated time periods and/or over dedicated tones.

For instance, in 6.993.5 ITU recommendation (vectored VDSL2), the transceiver units send pilot signals on the so-called SYNC symbols. The SYNC symbols occur periodically after every super frame, and are transmitted synchronously over all the vectored lines (super frame alignment). A similar technique has been adopted in G.fast.

On a given disturber line, a subset of the tones of a SYNC symbol (pilot tones hereinafter) are all 4-QAM modulated by the same pilot digit from a given pilot sequence, and transmit one of two complex constellation points, either '1+j' corresponding to '+1' or '−1−j' corresponding to '−1' (vectored VDSL2); or transmit one of three complex constellation points, either '1+j' corresponding to '−1' or '−1−j' corresponding to '−1' or '0+0j' corresponding to '0' (G.fast).

On a given victim line, both the real and imaginary part of the received DFT sample before equalization (G.fast), or of the normalized slicer error, which is the difference vector between the received and properly equalized DFT sample and the constellation point onto which this DFT sample is demapped (vectored VDSL2 and G.fast), are measured on a per pilot tone basis and reported to the VCU 130 for estimation of the various channel couplings.

The successive error samples gathered over a given victim line are next correlated with the pilot sequence used over a given disturber line in order to obtain an estimate of the channel coupling from the given disturber line into the given victim line. To reject the crosstalk contributions from the other disturber lines, the pilot sequences used over the respective disturber lines are mutually orthogonal (e.g., Walsh-Hadamard sequences).

The channel estimates are eventually used for initializing or updating the coefficients of the precoding matrix $P_k$ or of the postcoding matrix $Q_k$.

Presently, the VCU 130 starts first by configuring the transceivers 110 and 210 with the respective pilot sequences to use for modulation of the pilot tones of the SYNC symbols. The pilot sequences comprises T pilot digits using $\{+1, -1\}$ or $\{+1, 0, -1\}$ as alphabet. The pilot digit that modulates a given tone k during pilot symbol position t over line $L_i$ is denoted as $w_{i,k}^t$.

The SYNC symbols are not processed through the VPU 120 in order to target the channel matrix per se.

The VCU 130 next gathers measurement samples as measured by the transceivers 110 and 210 while SYNC symbols are being transmitted. The measurement sample as measured by the transceiver 110$i$ or 210$i$ over a victim line $L_i$ at tone k during pilot symbol position t is denoted as $e_{i,k}^t$.

The VCU 130 correlates T measurement samples $e_{i,k}^{t=t_0 \ldots t_0+T-1}$ as measured over a given victim line $L_i$ during a complete acquisition cycle with the T pilot digits $w_{j,k}^{t=t_0 \ldots t_0+T-1}$ the pilot sequence used over a given disturber line $L_j$ so as to obtain an estimate of the channel coupling $h_{ij,k}$ from the disturber line $L_j$ into the victim line $L_i$ at frequency index k. As the pilot sequences are mutually orthogonal, the contributions from the other disturber lines reduce to zero after this correlation step.

The VCU 130 determines estimates $H_k$ of the channel matrix or of the normalized channel matrix at respective tones k based on these correlation results. The nominal channel matrix is derived from a measure of the raw receive signals before equalization, whereas the normalized channel matrix—normalization is with respect to the direct channel gains—is derived from a measure of the slicer errors after channel equalization.

The VCU 130 is configured to determine the coefficients of the precoding matrix $P_k$ or postcoding matrix $Q_k$ at respective tones k based on the estimates $H_k$ of the channel matrix at respective tones k, and by means of an iterative update algorithm.

The VCU 130 first selects a set of reference tones $k_{REF}=\{k_1, k_2, \ldots\}$ from all the available tones. A reference tone is a tone whose precoder or postcoder is initialized with no neighboring channel information (e.g., initialized with the identity matrix I), and where a relatively large number of iterations through the iterative update algorithm are allowed if necessary.

The reference tones can be evenly spaced through the entire communication bandwidth. Alternatively, the spacing between the reference tones can be a function of the channel coherence, for instance higher spacing for the low-frequency range (well-conditioned channel with large coherence bandwidth) and closer spacing for the high-frequency range (ill-conditioned channel with narrow coherence bandwidth).

For convenience, it is further assumed that 1 ... K are the K available tones, that tones are processed in ascending order from 1 to K, and that tone k=1 belongs to the set of reference tones $k_{REF}$ in order to boot-up the iterative algorithm.

For each reference tone $k_i \in k_{REF}$, the VCU 130 initializes the coefficients of the precoding matrix $P_{ki}$ or postcoding matrix $Q_{ki}$ to some default value, typically the identity matrix I, and next determines some values for those coefficients based on the channel matrix estimate $H_{ki}$, and by means of successive iterations through the iterative update algorithm till some convergence criteria is met. The values computed for the coefficients of the precoding matrix $P_{ki}$ or postcoding matrix $Q_{ki}$ are then re-input to the iterative algorithm and used as initial starting values for determination of the coefficients of the precoding matrix $P_{ki+1}$ or postcoding matrix $Q_{ki+1}$ at next tone $k_i+1$. The VCU 130 is then able to determine the precoding matrix $P_{ki+1}$ or postcoding matrix $Q_{ki+1}$ based on the channel matrix estimate $H_{k_i+1}$, and by means of one or two iterations at most through the iterative update algorithm. In turn, the values computed for the coefficients of the precoding matrix $P_{ki+1}$ or postcoding matrix $Q_{ki+1}$ are re-input to the iterative algorithm and used as initial starting values for determination of the coefficients of the precoding matrix $P_{ki+2}$ or postcoding matrix $Q_{ki+2}$ at next tone $k_i+2$, and so forth with the subsequent tones till a new reference tone is met.

The VCU 130 can also process the tones in decreasing order, starting from a reference tone ki, and use the precoding matrix $P_{ki}$ or postcoding matrix $Q_{ki}$ computed at tone ki as input at tone $k_i-1$, and so forth.

Also, the VCU 130 does not need to run the iterative algorithm on each and every tone. Instead, the VCU 130 can use the proposed method for non-consecutive tones provided they are not too far apart from each other (i.e., within the channel coherence bandwidth), and then rely on interpolation to determine the vectoring coefficients at the intermediate tones in-between.

One benefit of using multiple reference tones is the ability to parallelization: multiple threads can be executed in parallel, each thread starting with a reference tone of the set $k_{REF}$ and going through all successive tones up to the next reference tone. Alternative multi-threading schemes can be used as well.

Another benefit of using multiple reference tones is the improved robustness: by having more than one start point, we avoid that the iterative algorithm gets stuck in a local optimum for most of the bandwidth.

In one embodiment, the VCU 130 makes use of the iMMSE algorithm to determine the precoding matrix $P_k$ or postcoding matrix $Q_k$. A good description of the iMMSE algorithm is given in the paper entitled "*Weighted Sum-Rate Maximization using Weighted MMSE for MIMO-BC Beamforming Design*" from Christensen et al. published in IEEE Transactions on Wireless communications magazine, vol. 7, No 12 in December 2008.

A pseudo-code for computing the precoding matrix $P_k$ by means of the iMMSE algorithm is given as follows:

For k=1:K
  If $k \in k_{REF}$
  then
    $i_{MAX}$=5; #exemplary value
    $P_k$=I;
  Else
    $i_{MAX}$=1;
    $P_k = P_{k-1}$;
  End;
  i=0;
  Do
    i++;
    $C_k = H_k P_k$;
    $d_k$=diag($C_k$);
    $n_k$=sum(abs($C_k$)$^2$,2)−abs($d_k$)$^2$+diag($K_{zz,k}$);
    $R_k$=DIAG($d_k^H$/(abs($d_k$)$^2$+$n_k$));
    $W_k$=DIAG(1+(abs($d_k$)$^2$ ./ $n_k$));
    $\alpha$=trace($W_k R_k K_{zz,k} R_k^H$)/Nm$_k$;
    $P_k = (H_k^H R_k^H W_k R_k H_k + \alpha I)^{-1} H_k^H R_k^H W_k$;
    $P_k$=sqrt(Nm$_k$/trace($P_k P_k^H$))$P_k$;
  Until Conv_Criteria OR (i==$i_{MAX}$);
End;

The mathematical notations used in this pseudo-algorithm read as follows: $A^H$ denotes the Hermitian (i.e., the conjugate transpose) of matrix A; trace(A) denotes the trace of matrix A; diag(A) picks up the diagonal coefficients of matrix A and outputs a vector; DIAG(a) outputs a diagonal matrix with the coefficients of vector a as diagonal coefficients and with zeros as off-diagonal coefficients; abs(a) denotes the coefficient-wise complex magnitude operator; ./ denotes the coefficient-wise division operator; sum(A,2) denotes the summation of the row elements of matrix A and outputs a vector; and sqrt(a) denotes the square root operator for scalar a.

In this pseudo-algorithm, $C_k = H_k P_k$ is the concatenated channel matrix; $d_k$ are the direct channel gains of the concatenated channel (i.e., the diagonal elements of matrix $C_k$); $K_{zz,k} = E(z_k z_k^H)$ denotes the noise covariance matrix; $R_k$ is the optimal linear MMSE receive filter to be used at receive side in conjunction with precoding matrix $P_k$ at transmit side to achieve the optimal aggregate data rate; $m_k$ is the discrete transmit power mask to comply with; i is the iteration index; $i_{MAX}$ is the maximum number of iterations allowed irrespective of whether the convergence criteria is fulfilled or not; and Conv_Criteria is a Boolean determining whether the convergence criteria is fulfilled with the newly-updated precoding matrix $P_k$ (TRUE) or not (FALSE).

As an example of convergence criteria, one may compute the Frobenius norm sqrt(trace(($P_k^{(i)} - P_k^{(i-1)}$)($P_k^{(i)} - P_k^{(i-1)}$)$^H$)) between two successive iterations i−1 and i, and test whether this norm is less than a given threshold $\epsilon$. If so, then additional iterations are not expected to substantially change the values of the precoding coefficients, and convergence towards the optimal value is assumed to be achieved.

The prior art solution initializes every tone with the identity matrix I (no channel knowledge), and iterates up to 10 times before convergence. In our proposal, only the reference tones are initialized with the identity matrix I. For the subsequent tones, channel knowledge is already built in the precoder as calculated for the previous tones. Because of tone correlation, initializing the iterative algorithm for tone k+1 with the precoder at tone k maintains performance and saves in computational cost up to 10 times in comparison to the original algorithm.

We can even compromise on performance at the reference tones and still expect the algorithm to gradually converge to an optimal value for the subsequent tones as channel knowledge is building up across neighboring tones. Then a lower number of iterations may be sufficient too for the reference tones, like in the pseudo-code above where 5 iterations at most are used for the reference tones.

Note that, for lower tones, the VDSL2 and G.fast bands coincide. For these lower tones we can count on the structure of the channel. Particularly for the low-frequency tones, the iMMSE algorithm above basically converges to the ZF precoder in one iteration only.

Figure 3:
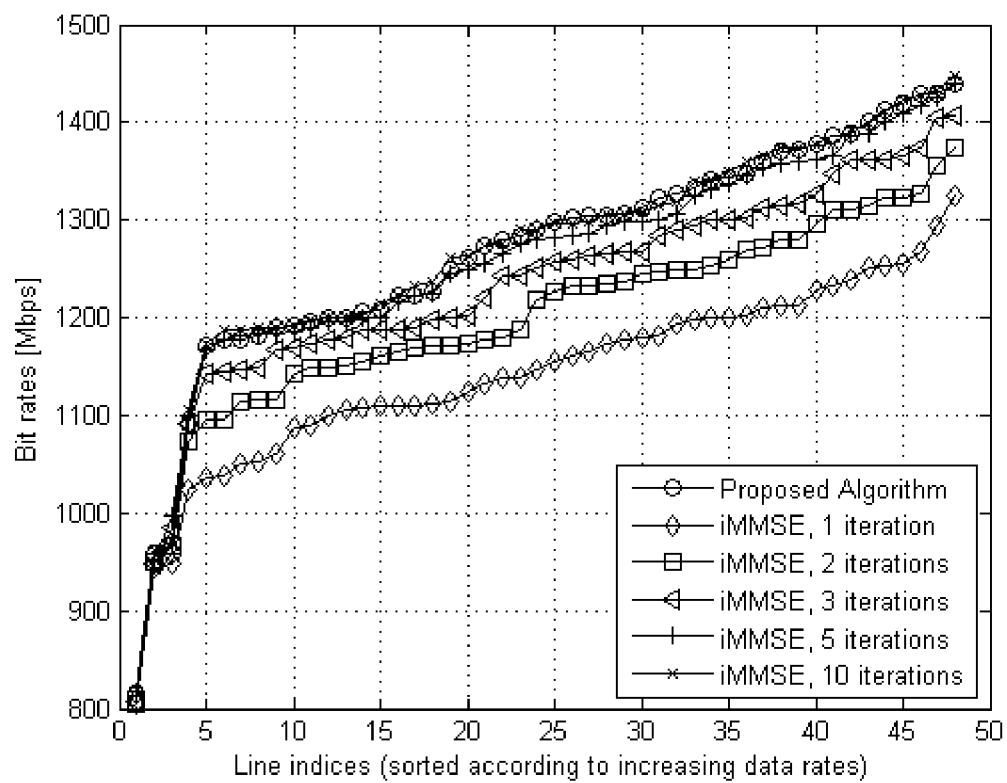
FIG. 3 is a plot of the performance of the original iMMSE algorithm versus the proposed iMMSE algorithm.

The performance of the original method and of the algorithm above are illustrated in FIG. 3, which represents the data rate performance of a 48 users G.fast 212 MHz communication system. The achieved data rates are plotted for respective maximum numbers of iterations in the original iMMSE and for the proposed algorithm.

The number of reference tones needed to achieve good performance is rather small. For the performance of FIG. 3, only 80 equally-spaced tones out of the 4096 tones were used as reference tones. In each of them, a maximum of 5 iterations were allowed.

We observe how the former converges slowly, in about 10 iterations. The proposed algorithm performs almost equally well, with a 10-fold decrease in computational cost.

For the postcoding matrix $Q_k$, the iMMSE algorithm yields the linear MMSE receive filter, and can be computed in one shot without any iteration.

In another alternative embodiment, the VCU 130 makes use of the Schulz method to determine the precoding matrix $P_k$ or postcoding matrix $Q_k$.

The Schulz method has been designed for computing matrix inverses through successive iterations, and thus is especially suited for ZF precoding or postcoding.

For ZF precoding, the channel inverse is computed through the following iterative update formula:

$$P_k = P_k(2I - H_k P_k).$$

This formula is guaranteed to converge to the inverse of $H_k$ when the initial $P_k$ is close enough to the inverse, or when the initial $P_k$ is chosen as $P_k = \alpha H_k^H$ where a is taken in the interval [0, 2/$\rho(H_k P_k - I)$] with $\rho$ referring to any function that upper bounds the spectral radius. Given that the channel does not change much from tone to tone, we exploit the best solution of the previous tone as an initial value for the current tone. simulations demonstrate that this speeds up convergence with a 10-fold factor.

A pseudo-algorithm for computing the precoding matrix $P_k$ by means of the iterative Schulz method is given as follows:

For k=1:K
  If $k \in k_{REF}$
  then
    $i_{MAX}$=20; #exemplary value
    $P_k = H_k^H$;
    e=$\|H_k P_k - I\|_F$;

If e≥1
Then
 $\alpha=1/(1+e)^2$;
 $P_k=\alpha H_k^H$;
End
Else
 $i_{MAX}=2$;
 $P_k=P_{k-1}$;
End;
i=0;
Do
 i++;
 $P_k=P_k(2I-H_kP_k)$
Until Convergence Criteria OR (i==$i_{MAX}$);
End
wherein $\|A\|_F$=sqrt(trace($AA^H$)) denotes the Frobenius norm of matrix A.

For ZF postcoding, the channel inverse is computed through the following iterative update formula:

$$Q_k=(2I-Q_kH_k)Q_k.$$

Figure 4:
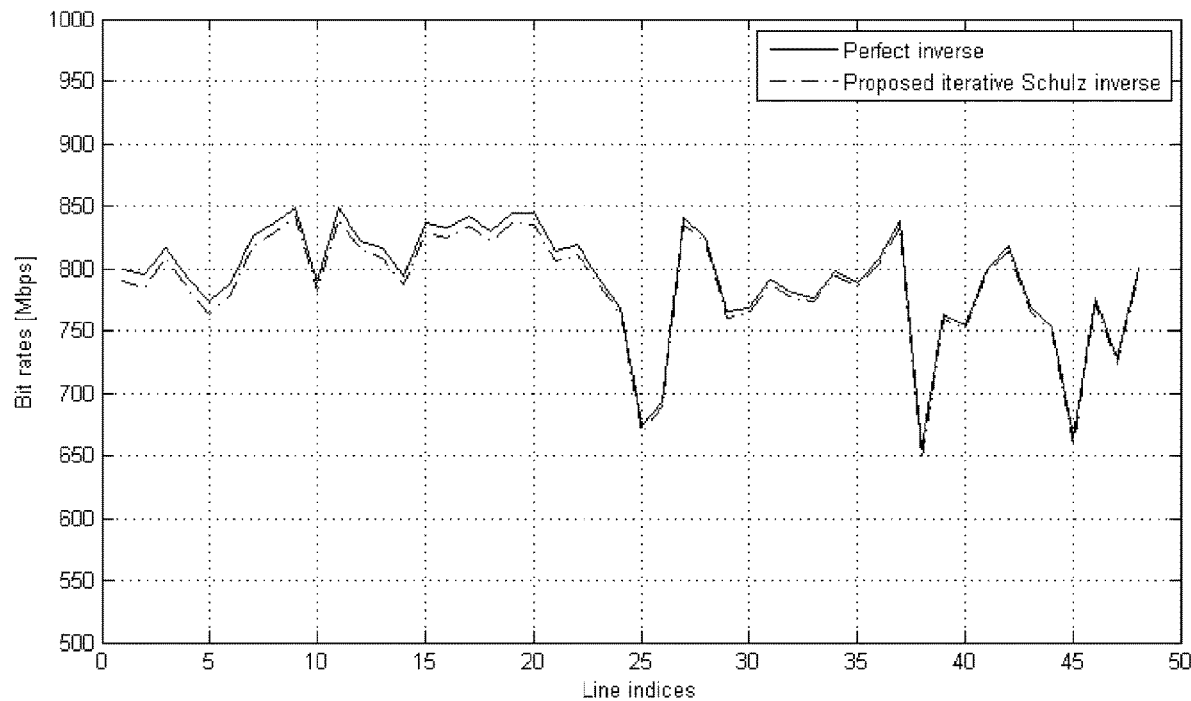
FIG. 4 is a plot of the performance of the original Schulz method versus the proposed Schulz method.

A pseudo-algorithm for computing the postcoding matrix $Q_k$ by means of the iterative Schulz method is given as follows:
For k=1:K
 If k∈$k_{REF}$
 then
 $i_{MAX}=20$;
 $Q_k=H_k^H$;
 e=$\|H_kP_k-I\|_F$;
 If e≥1
 Then
  $\alpha=1/(1+e)^2$;
  $Q_k=\alpha H_k^H$;
 End
 Else
 $i_{MAX}=2$;
 $Q_k=Q_{k-1}$;
 End;
 i=0;
 Do
 i++;
 $Q_k=(2I-Q_kH_k)Q_k$
 Until Convergence Criteria OR (i==$i_{MAX}$);
End There is plotted in FIG. 4 the simulation results between the perfect inverse method and the proposed Schulz iterative method exploiting tone correlation. Simulations demonstrate that only two iterations per tone are necessary to converge to within 1% of rate accuracy compared to a perfect inverse. The Schulz iterations are particularly interesting in a system where the matrix multiplication operations are accelerated to the maximum, either by straight forward hardware acceleration or increased parallelization.

Figure 5:
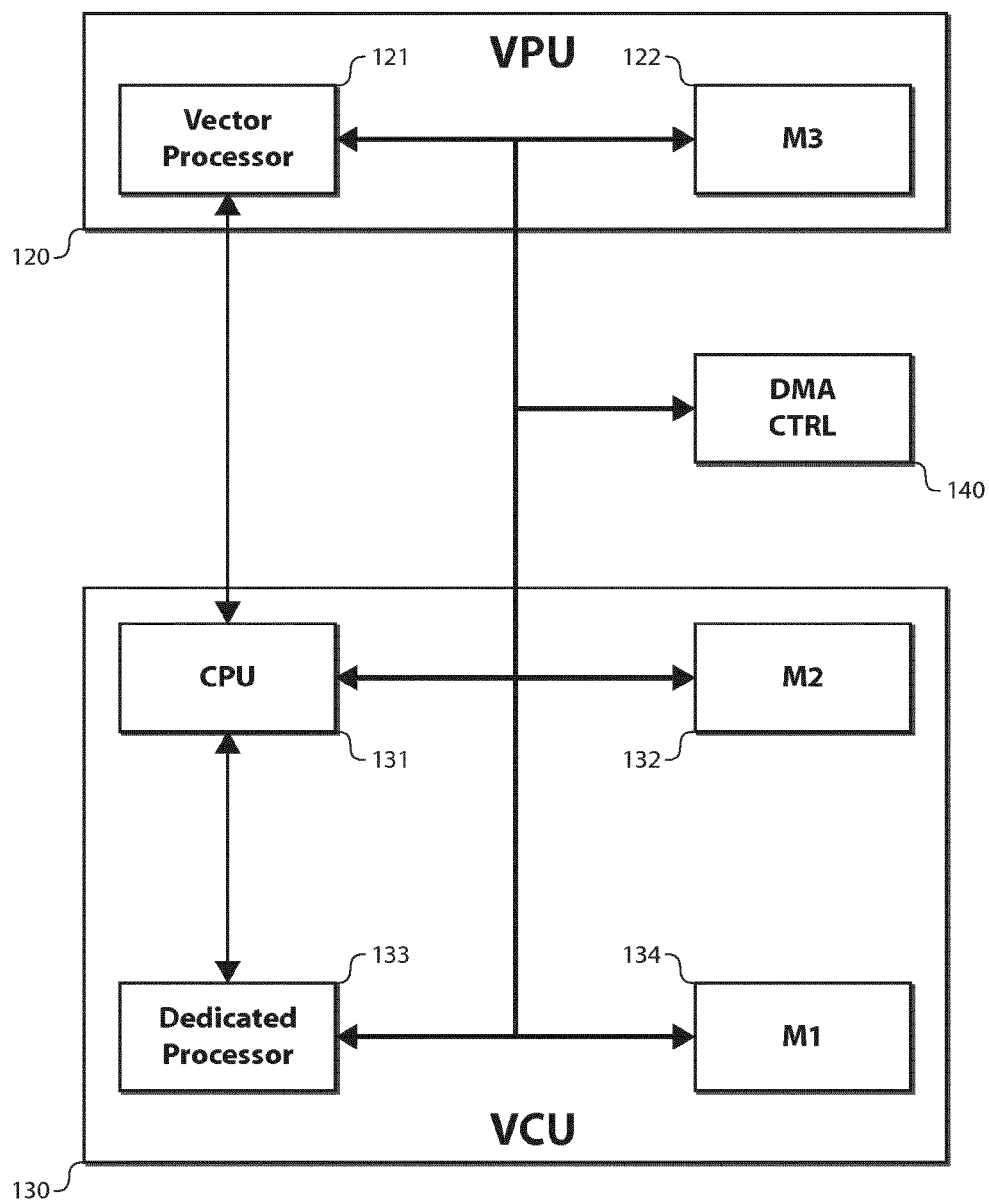
FIG. 5 represents further details about a vectoring controller.

The high-level hardware architecture for the implementation of the algorithms above is depicted in FIG. 5, wherein further details about the VPU 120 and the VCU 130 are shown.

The VPU 120 comprises a vectoring processor 121 for jointly processing the transmit user samples and the receive data samples, and a working memory 122 (or M3 memory) wherein the precoding and postcoding coefficients to be used for crosstalk mitigation are stored.

The VCU 130 is shown as comprising a generic Central Processing Unit (CPU) 131, and a slow-access memory 132 (or M1 memory), such as DDR memory. The VCU 130 further comprises a dedicated processing unit 133 with hardware acceleration for efficiently computing the precoding matrix $P_k$ or postcoding matrix $Q_k$, such as a Digital Signal Processor (DSP), and a fast-access memory 134 (or M1 memory), such as Level 1 (L1) cache memory.

The processing units 121, 131 and 133 are coupled to the memory units 122, 132 and 134 through a memory bus. The CPU 131 is further coupled to the dedicated processor 133 and to the vectoring processor 121.

The configuration of the VPU 120 is two-fold: first, the coefficients of the precoding matrix $P_k$ or of the postcoding matrix $Q_k$ are computed within the VCU's internal memory 132 and 134. Second, the newly-computed vectoring coefficients are pushed by the VCU 130 into the VPU's working memory 122. In order not to disturb the VPU operation, the new vectoring coefficients are written within an unused memory area of the memory 122. Then, from a given DMT symbol onwards, a pointer pointing towards the active set of vectoring coefficients to be used by the VPU 120 as effective precoding matrix $P_k$ or postcoding matrix $Q_k$ is switched towards the memory area where the new vectoring coefficients have been written to, thereby releasing the memory area where the previous vectoring coefficients were stored and allowing smooth transition between the two sets of vectoring coefficients. And so forth with the next VPU update. The VPU 120 can be updated on a per-tone basis or on a per group of tones basis.

There is further shown in FIG. 5 a Direct Memory Access (DMA) controller 140 coupled to the memory units 122, 132 and 134 for optimal data transfer there between. The DMA controller 140 can be triggered on-purpose whenever a big chunk of data need to be transferred from one place of the memories 122, 132 or 134 to another without involving the processors for this task. The presence of the DMA controller 140 is optional.

Figure 6:
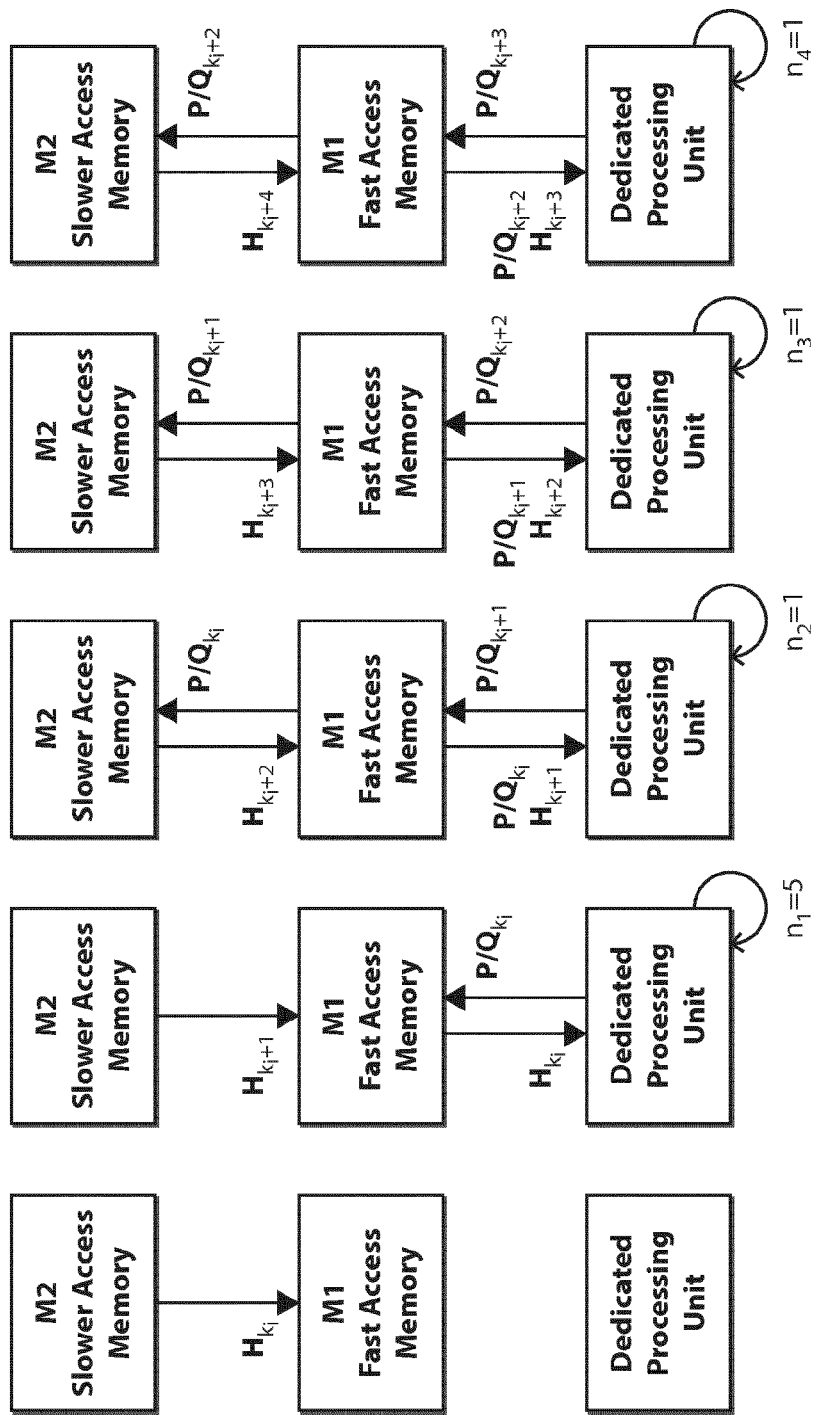
FIG. 6 represents the readings and writings from and into respective memory units for determination of the vectoring matrices.

There is seen in FIG. 6 the successive writings and readings into the respective memory units during the determination of the precoding matrix $P_k$ or postcoding matrix $Q_k$ at successive tones.

First, the channel matrix at the respective tones is estimated as aforementioned, and the channel matrix estimates $H_k$ at the respective tones k are stored in the slow-access memory M2 for further use.

The channel estimate $H_{ki}$ at reference tone $k_i$ is loaded from the slow-access memory M2 into the fast-access memory M1. This task can be performed directly by the CPU 131, or by the DMA controller 140 upon trigger from the CPU 131.

The CPU 131 then makes a call to the dedicated processor 133 with as input parameter, a pointer pointing towards the channel matrix estimates $H_{ki}$ in memory M1. Thereupon, the dedicated processor 133 reads the channel estimates $H_{ki}$ from the fast-access memory M1, and determines an optimal precoding matrix $P_{ki}$ or postcoding matrix $Q_{ki}$ by means of successive iterations through the iterative update algorithm. The respective numbers of iterations through the iterative update algorithm are indicated along loop-back circles for illustrative purpose. Presently, the maximum number of 5 iterations were used for determining the vectoring coefficients at reference tone $k_i$ (see "$n_1$=5" in FIG. 6).

While the precoding matrix $P_{ki}$ or postcoding matrix $Q_{ki}$ is being computed, the channel matrix estimate $H_{ki+1}$ at next tone $k_i$+1 is already loaded from the slow-access memory M2 into the fast-access memory M1.

When computation completes, the dedicated processor 133 writes the computed precoding matrix $P_{ki}$ or postcoding matrix $Q_{ki}$ at reference tone $k_i$ into the fast-access memory M1, and returns the call from the CPU 131 with as output parameter, a pointer pointing towards the computed precoding matrix $P_{ki}$ or postcoding matrix $Q_{ki}$ in memory M1.

The computed precoding matrix $P_{ki}$ or postcoding matrix $Q_{ki}$ is then loaded from the fast-access memory M1 into the slow-access memory M2 for further configuration of the VPU 120. Again this task can be performed directly by the CPU 131 or by the dedicated processor 133, or by the DMA controller 140 upon trigger from the CPU 131 or the dedicated processor 133.

With the proposed scheme, the computed precoding matrix $P_{ki}$ or postcoding matrix $Q_{ki}$ at tone $k_i$ is held in the fast-access memory M1 and re-input to the dedicated processor 133 for determination of the precoding matrix $P_{ki+1}$ or postcoding matrix $Q_{ki+1}$ at neighboring tone $k_i+1$.

The CPU 131 then makes a call to the dedicated processor 133 with as first input parameter, a first pointer pointing towards the channel matrix estimates $H_{ki+1}$ in memory M1, and as second input parameter, another pointer pointing towards the precoding matrix $P_{ki}$ or postcoding matrix $Q_{ki}$ in memory M1 as previously determined by the dedicated processor 133 at previous tone $k_i$.

The later is used as initial starting value in the iterative update algorithm for determination of the precoding matrix $P_{ki+1}$ or postcoding matrix $Q_{ki+1}$ at tone $k_{i+1}$, thereby substantially reducing the required number of iterations. Presently, only one iteration was used for determining the vectoring coefficients at neighboring tones $k_i+1$ (see "$n_2=1$" in FIG. 6).

The dedicated processor 133 returns the computed precoding matrix $P_{ki+1}$ or postcoding matrix $Q_{ki+1}$ at neighboring tone $k_i+1$, which is again transferred from the fast-access memory M1 to the slow-access memory M2 for further configuration of the VPU 120. And again, the computed precoding matrix $P_{ki+1}$ or postcoding matrix $Q_{ki+1}$ at tone $k_{i+1}$ is held in the fast-access memory M1 and re-input to the dedicated processor 133 for determination of the precoding matrix $P_{ki+2}$ or postcoding matrix $Q_{ki+2}$ at next tone $k_{i+2}$. And so forth with the subsequent tones as shown in FIG. 6.

For an optimal data transfer, the communication between the slow-access and fast-access memory units should be symmetrical, but its value is limited by the bus width and the memory technology used (e.g., single port, dual port, etc.). Depending on the memory technology used, reading and writing into the fast-access memory unit M1 could be done sequentially, or in parallel, or a mix of the two.

It is to be noticed that the term 'comprising' should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled' should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, Digital signal Processor (DSP) hardware, network processor, Application specific Integrated circuit (ASIC), Field Programmable Gate Array (FPGA), etc. Other hardware, conventional and/or custom, such as Read Only Memory (ROM), Random Access Memory (RAM), and non volatile storage, may also be included.

The invention claimed is:

1. A vectoring controller configured to determine a vectoring matrix that is used for joint processing of Discrete Multi-Tone DMT communication signals to be transmitted over, or received from, a plurality of subscriber lines, the vectoring controller being configured to determine first coefficient values for the vectoring matrix at a first tone based on a first number of iterations through an iterative update algorithm and based on a first channel matrix estimate at the first tone, and to determine second coefficient values for the vectoring matrix at a second neighboring tone based on a second number of iterations through the iterative update algorithm and based on a second channel matrix estimate at the second tone, wherein the vectoring controller is further configured to start with default coefficient values as initial values for the determination of the first coefficient values through the iterative update algorithm, and to start with the first coefficient values as initial values for the determination of the second coefficient values through the iterative update algorithm, and wherein the vectoring controller is further configured to set the second number of iterations to a value that is lower than the first number of iterations.

2. A vectoring controller according to claim 1, wherein the iterative algorithm is an iterative Minimum Mean Squared Error iMMSE update algorithm, and wherein the vectoring controller is further configured to set the second number of iterations to 1.

3. A vectoring controller according to claim 1, wherein the iterative algorithm is a Schulz update algorithm, and wherein the vectoring controller is further configured to set the second number of iterations to 1, 2 or 3.

4. A vectoring controller according to claim 1, wherein the vectoring controller is further configured to derive the first and second channel matrix estimates from raw Discrete Fourier Transform DFT samples of signals received from the subscriber lines while crosstalk probing signals are being transmitted over the subscriber lines.

5. A vectoring controller according to claim 1, wherein the vectoring controller is further configured to derive the first and second channel matrix estimates from slicer error samples of signals received from the subscriber lines while crosstalk probing signals are being transmitted over the subscriber lines.

6. A vectoring controller according to claim 1, wherein the vectoring controller is further configured to determine third coefficient values for the vectoring matrix at a third further-neighboring tone based on a third number of iterations through the iterative update algorithm and based on a third channel matrix estimate at the third tone,
wherein the vectoring controller is further configured to start with the second coefficient values as initial values for the determination of the respective third coefficient values through the iterative update algorithm,
and wherein the vectoring controller is further configured to set the third number of iterations to a value that is lower than to the first number of iterations.

7. A vectoring controller according to claim 6, wherein the first, second and third tones are tones with increasing or decreasing tone index.

8. A vectoring controller according to claim 7, wherein the first tone is selected from among a set of reference tones.

9. A vectoring controller according to claim 1, wherein the vectoring controller comprises a processor, a fast-access memory and a slower-access memory,
wherein the slower-access memory is configured to hold the first channel matrix estimate, wherein the fast-access memory is configured to load the first channel matrix estimate from the slower-access memory,
wherein the processor is configured to read the first channel matrix estimate from the fast-access memory, to determine the first coefficient values, and to write the first coefficient values into the fast-access memory,
wherein the slower-access memory is configured to load the first coefficient values from the fast-access memory, and to hold the first coefficient values for further configuration of a vectoring processor,
and wherein the first coefficient values are retained in the fast-access memory for further determination of the second coefficient values.

10. A vectoring controller according to claim 9, wherein the processor is further configured to determine the second coefficient values, and to substitute the second coefficient values for the first coefficient values in the fast-access memory,
and wherein the second coefficient values are retained in the fast-access memory for further determination of the third coefficient values.

11. A vectoring controller according to claim 9, wherein the processor is configured to run multiple threads for determination of coefficient values for the vectoring matrix at respective tones.

12. An access node comprising a vectoring controller according to claim 1.

13. A method for determining a vectoring matrix that is used for joint processing of Discrete Multi-Tone DMT communication signals to be transmitted over, or received from, a plurality of subscriber lines, the method comprising:
determining first coefficient values for the vectoring matrix at a first tone based on a first number of iterations through an iterative update algorithm and based on a first channel matrix estimate at the first tone;
determining second coefficient values for the vectoring matrix at a second neighboring tone based on a second number of iterations through the iterative update algorithm and based on a second channel matrix estimate at the second tone;
wherein the method further comprises starting with default coefficient values as initial values for the determining the first coefficient values through the iterative update algorithm, and starting with the first coefficient values as initial values for the determining the second coefficient values through the iterative update algorithm,
and wherein the second number of iterations is set to a value that is lower than the first number of iterations.

* * * * *